US012650508B1

(12) United States Patent
Mewborn et al.

(10) Patent No.: US 12,650,508 B1
(45) Date of Patent: Jun. 9, 2026

(54) VEHICLE-MOUNTED INTEGRATED RADAR-CAMERA SENSOR SYSTEM

(71) Applicant: Aptiv Technologies AG, Schaffhausen (CH)

(72) Inventors: Matthew Mewborn, Indianapolis, IN (US); Matthew Carrell, Kokomo, IN (US); John K. Blauert, Carmel, IN (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 19/387,757

(22) Filed: Nov. 13, 2025

(51) Int. Cl.
G01S 13/86        (2006.01)
G01S 7/02         (2006.01)
G01S 13/931       (2020.01)
H04N 23/51        (2023.01)

(52) U.S. Cl.
CPC ............ G01S 13/867 (2013.01); G01S 7/028 (2021.05); G01S 13/931 (2013.01); H04N 23/51 (2023.01)

(58) Field of Classification Search
CPC ...... G01S 13/867; G01S 7/028; G01S 13/931; H04N 23/51
See application file for complete search history.

(56) References Cited

U.S. PATENT DOCUMENTS

| | | | | |
|---|---|---|---|---|
| 2016/0125713 | A1* | 5/2016 | Blech | G08B 13/187 |
| | | | | 348/143 |
| 2024/0192312 | A1* | 6/2024 | Morinaka | G01S 7/04 |
| 2024/0249529 | A1* | 7/2024 | Rivas | G01S 17/89 |
| 2025/0347802 | A1 | 11/2025 | Bornemann | |
| 2025/0347803 | A1 | 11/2025 | Bornemann | |

FOREIGN PATENT DOCUMENTS

| | | |
|---|---|---|
| EP | 4647802 A1 | 11/2025 |
| EP | 4647808 A1 | 11/2025 |

* cited by examiner

*Primary Examiner* — Timothy A Brainard
(74) *Attorney, Agent, or Firm* — Miller Johnson

(57) ABSTRACT

An integrated sensor system includes a radome, a camera assembly, a radar antenna housing, a radar circuit board, and a rear cover. The radome includes a main body portion and a set of connecting portions and defines a first opening. The camera assembly includes a camera lens, a sealing member disposed between the camera lens and the radome, a camera housing, and a camera circuit board. The radar circuit board is configured to communicate with the camera circuit board and transmit and receive radio-frequency signals through the waveguide structure. The rear cover includes a connector configured to electrically connect the radar circuit board to an external electrical system and a set of vehicle mounting points.

20 Claims, 10 Drawing Sheets

VEHICLE-MOUNTED INTEGRATED RADAR-CAMERA SENSOR SYSTEM

FIELD

The present disclosure relates to sensors for autonomous vehicles and more particularly to sensor packages containing imaging and radar.

BACKGROUND

It is common for modern vehicles to incorporate sensor systems to assist users in controlling the vehicle (including parking maneuvers), either by providing the driver with information. In various implementations, the information may include visual feeds from one or more cameras. In various implementations, systems use an array of ultrasonic distance sensors located in the vehicle's bumper, with the transmitted ultrasonic sound from each sensor being reflected back to provide a linear distance measurement of objects in front of each respective sensor. In various implementations, systems rely on ultrasonic sensing with some advanced systems implementing birds eye view (BEV) camera perception on top. In various implementations, sensor systems rely on radar systems located, for example, in the front grill, below the bumper, and/or in a B-pillar. However, these perception systems have limitations in terms of reliability and accuracy, making current slow-speed maneuvering and parking aid systems and advanced driver assistance systems (ADAS) unreliable. Systems that use traditional radar installation locations (such as vehicle bumpers, the vehicle front grill, and/or vehicle B-pillars) cannot provide a seamless coverage in the immediate vicinity of the vehicle, even if the sensing devices are capable of short-range sensing. Further, systems relying solely on cameras (such as a backup camera) have limitations including difficulty with depth perception, delays in assessing speed and distance, etc.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Further areas of applicability of the present disclosure will become apparent from the detailed description, the claims, and the drawings. The following statements are intended for purposes of illustration only and are not intended to limit the scope of the disclosure.

Statement 1: An integrated sensor system for a vehicle includes a radome including a main body portion and a set of connecting portions. The radome defines a first opening. The integrated sensor system includes a camera assembly including a camera lens, a sealing member disposed between the camera lens and the radome, a camera housing including a first set of alignment members, and a camera circuit board configured to engage the camera lens and the first set of alignment members. At least a portion of the camera lens is disposed in the first opening. The camera housing defines a second opening. At least a portion of the camera lens is disposed in the second opening. The integrated sensor system includes a radar antenna housing including a second set of alignment members and a waveguide structure. The radar antenna housing defines a recess. The second set of alignment members is configured to align the camera assembly with respect to the radar antenna housing in the recess. The integrated sensor system includes a radar circuit board configured to (i) communicate with the camera circuit board and (ii) transmit and receive radio-frequency (RF) signals through the waveguide structure. The integrated sensor system includes a rear cover including a connector configured to electrically connect the radar circuit board to an external electrical system, and a set of vehicle mounting points. The integrated sensor system is arranged to fit both camera and radar functionality into a small package that is the size of current camera systems, so that the increased functionality of radar can be added without changing the physical footprint. Recognizing the possibility that a vehicle manufacturer could expand the sensing capabilities of an existing camera sensor without having to reengineer the vehicle was a significant inventive contribution. The integrated sensor system may thereby provide a sensor unit that houses both camera and radar modules within a contained package.

Statement 2: In combination with any of the other Statements, a cross-section of the main body portion is square. The square shape matches some existing camera-only systems, and is easy to form in mounting materials such as sheet metal. In embodiments, the cross-section of the main body portion that is perpendicular to the optical axis of the camera is square. In embodiments, the main body portion has a cuboidal construction. This may thereby allow for simplified manufacturing and mounting within a vehicle.

Statement 3: In combination with any of the other Statements, the cross-section is approximately thirty-five millimeters by approximately thirty-five millimeters. While this size matches some existing camera-only systems, it is very difficult to achieve for a combination of camera and radar sensing. With this arrangement, the layered construction provides for a more compact assembly for meeting the above size specification.

Statement 4: In combination with any of the other Statements, a center of the first opening is offset from a center of the main body portion. In this way, by offsetting the first opening, the camera can be offset within the assembly, thereby making space for the waveguide structure of the radar sensor. As such, improved packaging of the radar and camera together can be achieved within the tight physical constraints of the unit.

Statement 5: In combination with any of the other Statements, the set of connecting portions is set back from a front face of the main body portion. In embodiments, the set of connecting portions is provided on the rear of the main body portion. By placing bulkier portions, like the set of connecting portions, rearward, behind the front of the radome, the protruding portion of the sensor system is able to match prior camera-only systems.

Statement 6: In combination with any of the other Statements, the set of connecting portions extends from a rear face of the main body portion. With this arrangement, the bulkier portions (like the set of connecting portions) of the radome may extend from the rear face of the radome to allow as much clearance as possible between the bulkier portions and the mounting surface. This may thereby minimize the risk that a vehicle manufacturer would have to make any modifications to use the integrated sensor system according to the principles of the present disclosure.

Statement 7: In combination with any of the other Statements, a cross-sectional area of the rear cover is greater than a cross-sectional area of the main body portion at all cross-sections forward of the rear face. As such, a cross-sectional area of the main body portion that is perpendicular to the optical axis of the camera may increase toward the rear of the main body portion. In this way, as the rear cover is set back from the mounting surface, it can be larger to thereby more easily accommodate the mechanical interfaces that interconnect the portions of the integrated sensor system.

Statement 8: In combination with any of the other Statements, the set of connecting portions includes a first connecting portion and a second connecting portion located at an opposite corner of the rear face from the first connecting portion. While more or fewer connecting portions could be used, locating the first and second connecting portions are located at opposite corners allows an even clamping force to be generated around the radome to maintain a liquid-tight seal between the radome and the rest of the integrated sensor system.

Statement 9: In combination with any of the other Statements, the main body portion includes a front face and a rear face opposite the front face, and the first opening extends from the front face through the rear face. With this arrangement, the opening may extend through the entire radome while this may make water-tight sealing more difficult, it avoids the need for the radome to be optically transparent.

Statement 10: In combination with any of the other Statements, the radar antenna housing includes a second set of connecting portions that match the set of connecting portions, and the rear cover includes a third set of connecting portions that match the second set of connecting portions. These connecting portions may locate the radar antenna housing with respect to the radome and also help to create a water-tight seal with the radome.

Statement 11: In combination with any of the other Statements, each of the set of connecting portions includes an aperture that aligns with an aperture of a respective one of the second set of connecting portions and an aperture of a respective one of the third set of connecting portions. The apertures allow fasteners, such as bolts, to be used to generate a clamping force to create a water-tight seal.

Statement 12: In combination with any of the other Statements, each of the set of connecting portions includes a through-hole aperture that aligns with a through-hole aperture of a respective one of the second set of connecting portions and a tapped, blind aperture of a respective one of the third set of connecting portions. The alignment of apertures allows a single bolt or other fastener to engage the radome, the radar antenna housing, and the rear cover, thereby simplifying and reducing cost of the bill of materials, and making manufacturing more foolproof.

Statement 13: In combination with any of the other Statements, a set of threaded fasteners corresponds one-to-one with the set of connecting portions. The design allows simple fasteners, such as bolts, to be used to assemble the integrated sensor system, without the need for one-time-use fasteners.

Statement 14: In combination with any of the other Statements, each of the set of connecting portions directly mates with a respective one of the second set of connecting portions without interference by the camera circuit board. In this way, the position of the camera circuit board may be independently controlled since it doesn't affect the mating of the radome with the radar antenna housing.

Statement 15: In combination with any of the other Statements, each of the second set of connecting portions directly mates with a respective one of the third set of connecting portions without interference by the radar circuit board. In this way, the position of the radar circuit board may be independently controlled since it doesn't affect the mating of the radar antenna housing with the back cover.

Statement 16: In combination with any of the other Statements, the set of connecting portions includes a first connecting portion and a second connecting portion, the second set of connecting portions includes a first connecting portion and a second connecting portion, and the third set of connecting portions includes a first connecting portion and a second connecting portion. The integrated sensor system can be interconnected with pairs of connecting portions, creating a simple manufacturing process.

Statement 17: In combination with any of the other Statements, the camera lens includes a first portion, a second portion, and a rim portion disposed between the first portion and the second portion, a cross-sectional area of the rim portion is larger than a cross-sectional area of the first portion and larger than a cross-sectional area of the second portion, the first portion is disposed in the first opening, and the second portion is optically coupled to the camera circuit board. The above features of the camera lens may allow the camera to create a water-tight seal with the radome and be optically aligned with the camera circuit board.

Statement 18: In combination with any of the other Statements, the sealing member surrounds the first portion, and the sealing member is sandwiched between the rim portion and a rear face of the first opening. The above design of the camera lens and the radome may allow a sealing member to create the water-tight seal with the radome so that the lens can have an unobstructed view of the exterior of the vehicle.

Statement 19: In combination with any of the other Statements, the rim portion is secured to a front side of the camera housing with an adhesive. The camera housing can be preassembled with adhesive so that final assembly is simplified, which is faster and less prone to error.

Statement 20: In combination with any of the other Statements, the second portion extends through the second opening. The second opening allows the second portion to directly optically interface with the camera circuit board.

Statement 21: In combination with any of the other Statements, the first set of alignment members locate the camera circuit board with respect to the camera housing. The camera circuit board can thereby be aligned with the camera housing without the need for perfect alignment between the camera circuit board and the radar antenna housing.

Statement 22: In combination with any of the other Statements, the camera circuit board includes a set of reliefs that correspond to the first set of alignment members to locate the camera circuit board with respect to the camera housing. The reliefs can be easily machined into the camera circuit board to avoid any need for manual alignment of the camera circuit board and the camera housing during manufacturing.

Statement 23: In combination with any of the other Statements, the set of reliefs corresponds one-to-one with all but one of the first set of alignment members. Leaving one corner of the camera circuit board without a relief is a poka-yoke feature preventing the camera circuit board from incorrectly placed at a 90°, 180°, or 270° rotation.

Statement 24: In combination with any of the other Statements, the second set of alignment members contacts the first set of alignment members to locate the camera housing with respect to the radar antenna housing. The camera housing alignment members can be used to position the camera circuit board and also to position the camera housing with respect to the radar antenna housing.

Statement 25: In combination with any of the other Statements, the second set of alignment members includes a first alignment member with first and second sides that respectively engage a first alignment member of the first set of alignment members, and a second alignment member with a first side that engages a fourth alignment member of the first set of alignment members. The three datums (both first sides and the second side) position and align the camera housing with the radar antenna housing.

Statement 26: In combination with any of the other Statements, the camera circuit board and the camera housing are fully contained within the recess. To allow for compact packaging, most of the camera assembly is nestled within the recess.

Statement 27: In combination with any of the other Statements, the waveguide structure defines first and second sides of the recess. The waveguide structure doesn't just transmit RF signals it also forms the mechanical structure in which the camera assembly is nestled Statement 28: In combination with any of the other Statements, a first portion of the waveguide structure defines the first side of the recess, and a second portion of the waveguide structure defines the second side of the recess. In embodiments, the waveguide structure is uniquely designed as an L-shape to leave room for the camera assembly.

Statement 29: In combination with any of the other Statements, the first portion of the waveguide structure and the second portion of the waveguide structure are orthogonal to each other. The orthogonal arrays of waveguide structures may allow embodiments to achieve improved field and depth of view at the frequencies of interest.

Statement 30: In combination with any of the other Statements, the first portion of the waveguide structure includes a plurality of receive waveguides, and the second portion of the waveguide structure includes a plurality of transmit waveguides. In embodiments where the waveguides in the waveguide structure have an L-shaped configuration, the receive waveguides are horizontally arrayed and the transmit waveguides are vertically arrayed. This may thereby provide an improved field and depth of view at the frequencies of interest.

Statement 31: In combination with any of the other Statements, the radar antenna housing is formed from at least one of: zinc, aluminum, or magnesium. These materials channel the RF signals while mitigating unwanted propagation and cross-talk.

Statement 32: In combination with any of the other Statements, the waveguide structure is a single piece including at least one of: zinc, aluminum, or magnesium. In embodiments where an L-shaped waveguide structure is adopted, the structure may be formed from a single piece of metal. This may provide improved rigidity and simplified manufacturing. For example, the waveguide structure may be extruded, cast, additively manufactured, etc.

Statement 33: In combination with any of the other Statements, the waveguide structure includes a plurality of receive waveguides corresponding to a plurality of receive elements of the radar circuit board, and a plurality of transmit waveguides corresponding to a plurality of transmit elements of the radar circuit board. The waveguide arrangement is reflected in the antenna placement on the radar circuit board. For example, the arrangement of antennas on the radar circuit board may have a shape that corresponds to the arrangement of waveguides.

Statement 34: In combination with any of the other Statements, the plurality of transmit waveguides are aligned and equally spaced, the plurality of receive waveguides are unequally spaced along a first direction, and one receive waveguide of the plurality of receive waveguides is offset, in a second direction transverse to the first direction, from a remainder of the plurality of receive waveguides. To increase the radar performance, the receive and transmit arrays are not arranged identically.

Statement 35: In combination with any of the other Statements, the rear cover includes a third set of alignment members configured to locate the radar circuit board with respect to the rear cover. The radar circuit board is aligned to the rear cover without needing to be separately aligned to the radar antenna housing.

Statement 36: In combination with any of the other Statements, the radar circuit board includes a set of reliefs that receives the third set of alignment members. The reliefs can be cut into the radar circuit board to easily locate and align the radar circuit board with the rear cover during manufacturing. By not having the reliefs be symmetrical, the board cannot inadvertently be placed in the rear cover upside-down.

Statement 37: In combination with any of the other Statements, the rear cover includes a front surface configured to engage the radar circuit board, a rear surface opposite the front surface, and a third set of connecting portions that corresponds to the set of connecting portions and protrudes from the rear surface. The connecting portions can extend back from the rear cover to allow for sufficient material to have tapped holes that will retain the threaded fasteners.

Statement 38: In combination with any of the other Statements, the set of vehicle mounting points protrudes from the rear surface. The vehicle mounting points protrude to ensure that the connecting portions do not prevent the integrated sensor system from mating to a mounting point of the vehicle.

Statement 39: In combination with any of the other Statements, each of the set of vehicle mounting points defines a respective one of a set of recesses that is configured to receive a respective one of a set of vehicle fasteners. The protruding mounting points are configured to securely retain vehicle fasteners.

Statement 40: In combination with any of the other Statements, each of the set of vehicle fasteners is a threaded fastener. The protruding mounting portions comprise a tapped hole configured to retain a threaded fastener.

Statement 41: In combination with any of the other Statements, the radome includes a first rib, and the radar antenna housing includes a first groove configured to receive the first rib. To create a water-tight seal between the radome and the radar antenna housing, the rib fits within the groove.

Statement 42: In combination with any of the other Statements, the radar antenna housing includes a second rib, and the rear cover includes a second groove configured to receive the second rib. To create a water-tight seal between the radar antenna housing and the rear cover, the rib fits within the groove.

Statement 43: a thermal interface material is configured to conduct heat from the radar circuit board to the rear cover. In a compact package, heat dissipation is important. The surface area of the rear cover, as well as its connection to the vehicle (an excellent heat sink) can be used to dissipate heat from the radar circuit board.

Statement 44: In combination with any of the other Statements, the integrated sensor system is configured to be mounted at a mounting surface of an exterior of the vehicle, and the radome is configured to be disposed within an opening in the mounting surface. The radome fits in the mounting surface, which may be the same mounting surface as for an existing camera-only system.

Statement 45: In combination with any of the other Statements, when the integrated sensor system is mounted in the vehicle, the radome is configured to extend past the mounting surface, and the set of connecting portions and the rear cover are configured to remain at an interior of the mounting surface. Although the radome may be the same size as a small sensor cube, the added bulk of the integrated sensor system is designed to be behind the mounting surface, so that it is not visible to the exterior of the vehicle and does not create a need to redesign the mounting surface.

Statement 46: In combination with any of the other Statements, a front surface of the radome includes a plurality of parallel raised ribs. The ribs may allow an air gap between the radome and the waveguide structure to be reduced, thereby allowing for the overall size of the package to be reduced. The ribs may also increase the diffraction of the radar waves, creating a larger field of view. Further, placing the radome closer to the waveguide structure may allow the camera lens to protrude further from the radome, increasing the field of view of the camera.

Statement 47: In combination with any of the other Statements, an exterior of the front surface is flat and an interior of the front surface includes the plurality of parallel raised ribs. Having the ribs internally facing the waveguide structure may allow the radome to not couple dielectric waveguide modes, allowing the surface to be positioned closer to the waveguide structure.

Statement 48: In combination with any of the other Statements, the camera lens protrudes from the radome. This may allow the camera lens to have a greater field of view.

Statement 49: In combination with any of the other Statements, the camera lens includes a dome portion connected to a cylindrical portion; all of the dome portion and at least some of the cylindrical portion protrudes from a front surface of the radome; and the camera lens has a field of view of at least 180 degrees. By locating the dome portion of the camera lens past the front of the radome, the field of view of 180 degrees or more can be achieved.

Statement 50: An integrated sensor system for a vehicle includes a radome. The integrated sensor system includes a camera assembly including a camera lens, a camera housing including a first set of alignment members, and a camera circuit board configured to engage the camera lens and the first set of alignment members. The integrated sensor system includes a radar antenna housing including a second set of alignment members and a waveguide structure. The radome covers the waveguide structure. The waveguide structure defines a recess. The second set of alignment members is configured to align the camera assembly with respect to the radar antenna housing in the recess. The integrated sensor system is arranged to fit both camera and radar functionality into a small package that is the size of current camera systems, so that the increased functionality of radar can be added without changing the physical footprint. Recognizing the possibility that a vehicle manufacturer could expand the sensing capabilities of an existing camera sensor without having to reengineer the vehicle was a significant inventive contribution. The integrated sensor system may thereby provide a sensor unit that houses both camera and radar modules within a contained package.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Integrated Sensor System

FIGS. 1-6 illustrate an integrated sensor system 100 (also referred to as an integrated sensor unit). The integrated sensor system 100 may be installed in various locations on a vehicle to enhance or replace traditional camera only or radar only systems, such as backup cameras or rear park assist features. In various implementations, the integrated sensor system 100 is substantially cube shaped. In various implementations, the integrated sensor system 100 has an approximate overall size of thirty-five millimeters in depth by thirty-five millimeters in width by thirty-five millimeters in height (35 mm×35 mm×35 mm). In other implementations, the integrated sensor system 100 has a front portion that is approximately thirty-five millimeters in width by approximately thirty-five millimeters in height and a rear portion that is larger in at least one of width or height.

Figure 1:
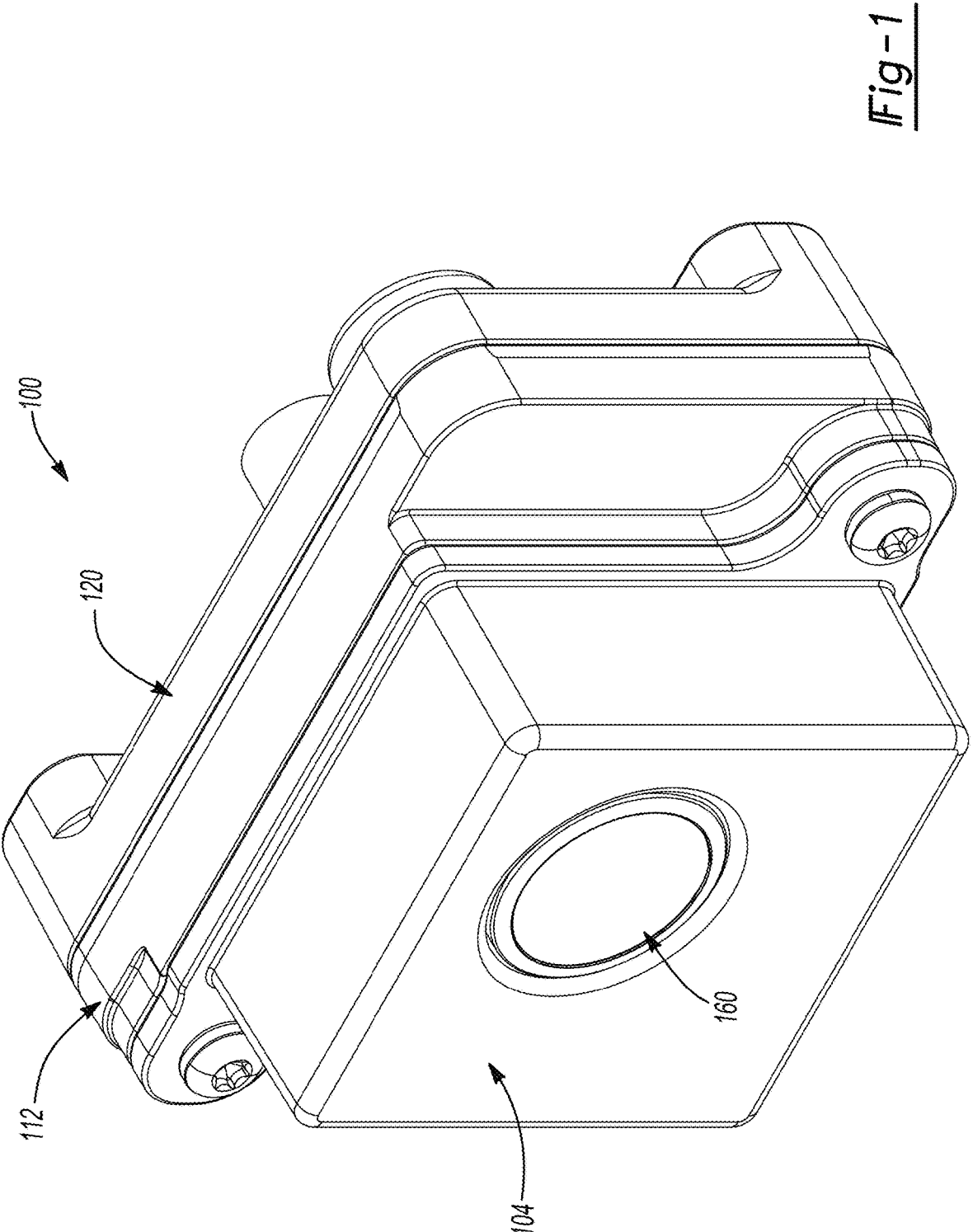
FIG. 1 is a perspective view of an integrated sensor system according to the principles of the present disclosure.
Figure 2A:
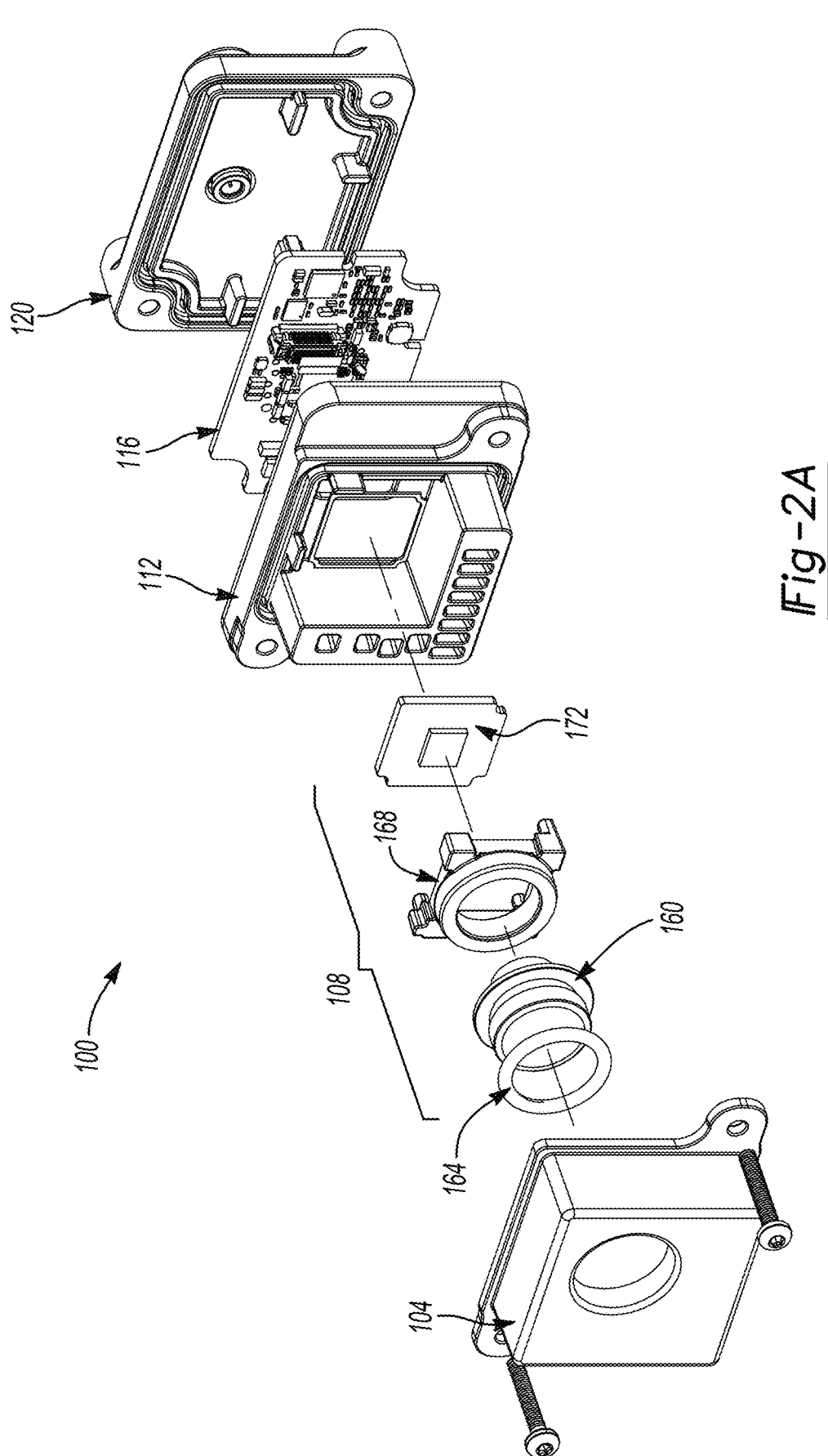
FIG. 2A is an exploded view of the integrated sensor system of FIG. 1.
Figure 2B:
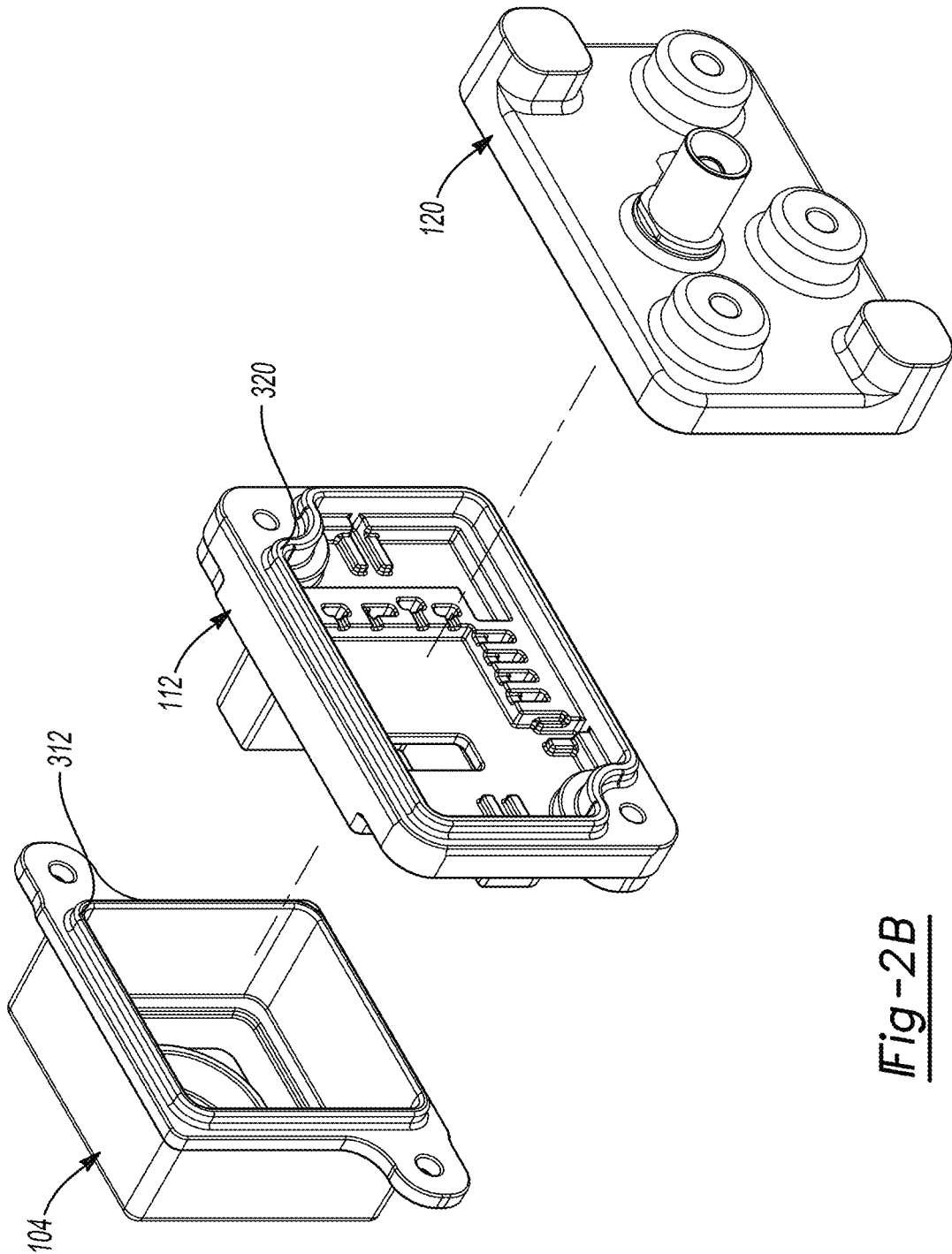
FIG. 2B is another angle of the exploded view of FIG. 2A.

As shown in FIGS. 2A and 2B, the integrated sensor system 100 may include a radome 104, a camera assembly 108, a radar antenna housing 112, a radar circuit board 116, and a rear cover 120. In an assembled configuration, the camera assembly 108, the radar antenna housing 112, and the radar circuit board 116 may be disposed between the radome 104 and the rear cover 120. The radar antenna housing 112 may be disposed between the camera assembly 108 and the radar circuit board 116.

In various implementations, the radome 104, the camera assembly 108, the radar antenna housing 112, the radar circuit board 116, and the rear cover 120 are detachably-coupled to one another. In various implementations, the integrated sensor system 100 includes a first fastening member 304 and a second fastening member 308 that, collectively, couple the radome 104 to the rear cover 120 with the camera assembly 108, the radar antenna housing 112, and the radar circuit board 116 therebetween. In various implementations, each of the first fastening member 304 and the second fastening member 308 are threaded fasteners, such as screws.

In various implementations, the integrated sensor system 100 is configured to be mounted at a mounting surface on an exterior of a vehicle. In various implementations, a cross-section of a front portion of the radome 104 is approximately thirty-five millimeters in width and approximately thirty-five millimeters in height. In various implementations, the front portion of the radome 104 is located in an opening of the mounting surface and extends partially through the opening. In various implementations, the opening is sized to match the front portion of the radome 104. In various implementations, the radar antenna housing 112, the rear cover 120, and a rear portion of the radome 104 have a larger cross-sectional area than the opening and remain interior to the mounting surface.

Radome

The radome 104 may include a main body portion 118 and a set of connecting portions 122. In various implementations, the main body portion 118 may be square: that is, the width and the height of the main body portion 118 may be approximately equal. The corners of the square may be sharp or otherwise, such as radiused or chamfered. In various implementations, the depth of the main body portion 118 is less than its width or height.

The main body portion 118 may include a front face 124, a rear face 128 opposite the front face 124, and four side faces. The transition between the front face 124 and the side faces may be sharp or otherwise, such as radiused or chamfered. The rear face 128 includes a first edge 132 and a second edge 136 opposite the first edge 132. The set of connecting portions 122 may include a first connecting portion 122-1 extending from the first edge 132 and a second connecting portion 122-2 extending from the second edge 136.

The first connecting portion 122-1 may protrude from the first edge 132. The first connecting portion 122-1 may define a first aperture 148-1. In the assembled configuration, the first aperture 148-1 may receive at least a portion of the first fastening member 304. The second connecting portion 122-2 may protrude from the second edge 136. The second connecting portion 122-2 may define a second aperture 148-2. In the assembled configuration, the second aperture 148-2 may receive at least a portion of the second fastening member 308. The term aperture includes an opening into which a fastener can extend: for example, the aperture may be a through hole extending all the way through an object or a blind hole that is closed off without extending all the way through the object. The aperture may taper from one end to the other. The aperture may or may not be tapped to receive threads of a fastener. According to the principles of the present disclosure, some or all apertures may be replaced by openings that are not fully enclosed: for example, a cutout, recess, notch, slot, or keyhole.

In various implementations, the radome 104 defines a first opening 156 extending through and between the front face 124 and the rear face 128. In the assembled configuration, the first opening 156 may receive portions of one or more components of the camera assembly 108.

In various implementations, the radome 104 includes a first rib 312 extending from the rear face 128. In various implementations, the first rib 312 extends along or proximate a perimeter of the rear face 128. As discussed further below, the first rib 312 may engage a corresponding feature on the radar antenna housing 112 to align the radome 104 to the radar antenna housing 112 and help create a watertight seal between the radome 104 and the radar antenna housing 112.

Camera Assembly

The camera assembly 108 may include a camera lens 160, a sealing member 164, a camera housing 168, a camera circuit board 172. As discussed further below, in the assembled configuration, the camera assembly 108 may be at least partially disposed in the first opening 156 of the radome 104 and/or a corresponding recess or protrusion of the radar antenna housing 12.

The camera lens 160 may include a first portion 176, a second portion 180, and a rim portion 184 disposed between the first portion 176 and the second portion 180. Each of the first portion 176, the second portion 180, and the rim portion 184 may surround and be symmetrical about a central axis. In this regard, each of the first portion 176, the second portion 180, and the rim portion 184 may be substantially cylinder shaped. In various implementations, a cross-sectional area of the rim portion 184 is larger than a cross-sectional area of the first portion 176 and/or a cross-sectional area of the second portion 180. In the assembled configuration the first portion 176 of the camera lens 160 may be disposed in the first opening 156 of the radome 104.

The sealing member 164 may surround the first portion 176 of the camera lens 160. In the assembled configuration, the sealing member 164 is disposed in the first opening 156. The sealing member 164 may create a watertight seal between the radome 104 and the camera assembly 108. In various implementations, the sealing member 164 is a gasket, such as an O-ring.

The camera housing 168 may include a front side 188, a rear side 192 opposite the front side 188, a first edge 196, a second edge 200, an upper edge 204, and a first set of alignment members 206. In various implementations, the first set of alignment members 206 includes a first alignment member 206-1 and a second alignment member 206-2. Each of the front side 188 and the rear side 192 may extend between the first edge 196 and the second edge 200. The upper edge 204 may extend between the first edge 196 and the second edge 200. The first alignment member 206-1 may protrude from the upper edge 204. The second alignment member 206-2 may protrude from the second edge 200. In various implementations, the camera housing 168 defines an opening 216 extending through the front side 88 and the rear side 192. In the assembled configuration, the second portion 180 of the camera lens 160 may be disposed in the opening 216.

In various implementations, the camera lens 160 is coupled to the camera housing 168 with an adhesive.

The camera circuit board 172 may be in communication with the camera lens 160, such that the camera circuit board 172 may transmit information to and receive information from the camera lens 160. In the assembled configuration, the camera circuit board 172 may engage the second portion 180 of the camera lens 160 and/or the rear side 192 of the camera housing 168.

Radar Antenna Housing

The radar antenna housing 112 may include a first surface 220, a second surface 224 spaced apart from the first surface 220, a second set of alignment members 222, and a waveguide structure 236 protruding from the first surface 220. The first surface 220 faces the radome 104 and the second surface 224 faces the rear cover 120.

In various implementations, the second set of alignment members 222 includes a fifth alignment member 222-1 and a sixth alignment member 222-2 each protruding from the first surface 220. In various implementations, the radar antenna housing 112 defines a recess 240 formed in the first surface 220. In various implementations, the radar antenna housing 112 is formed from at least one of: zinc, aluminum, or magnesium.

Figure 3:
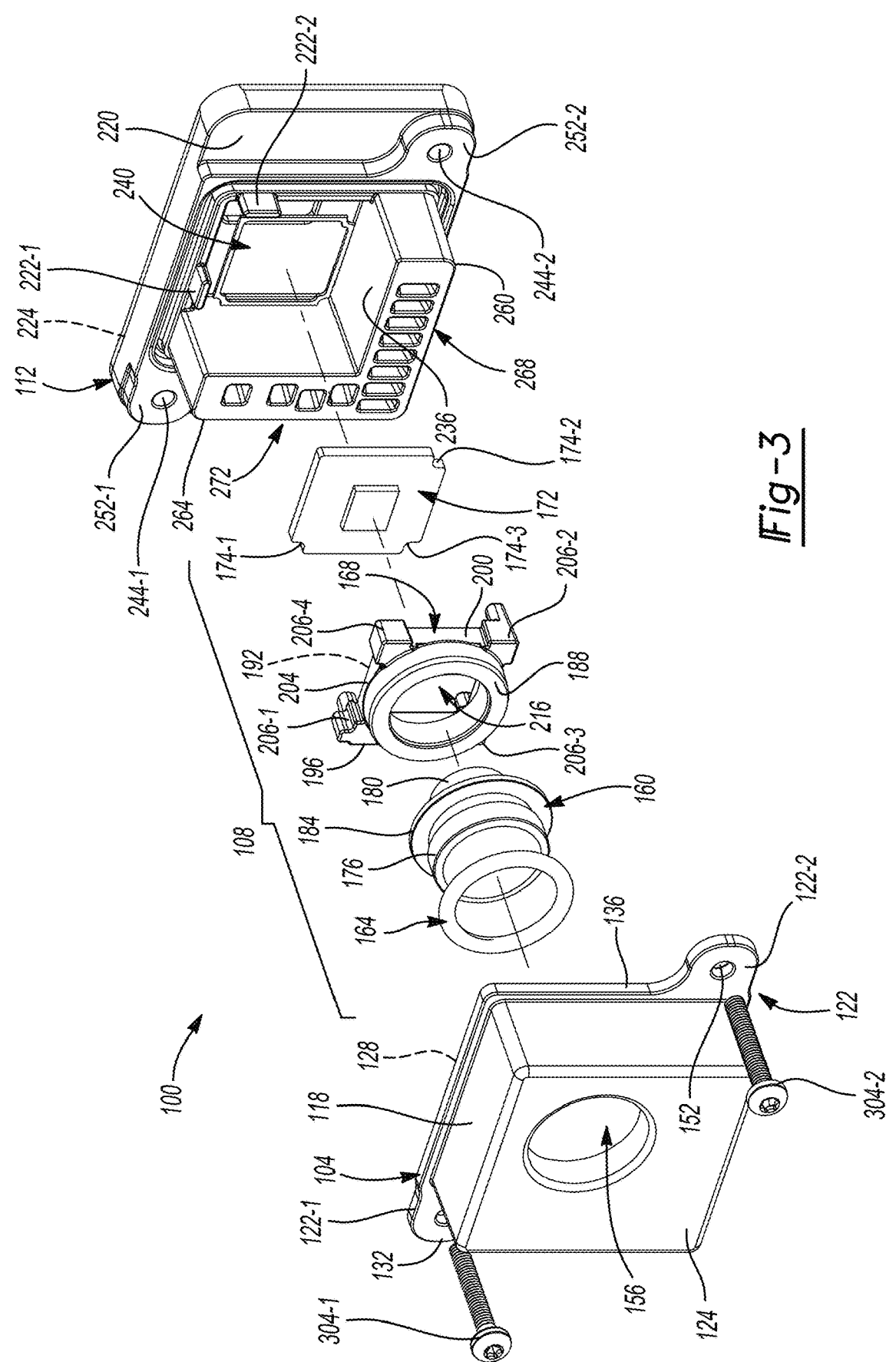
FIG. 3 is an exploded view of a first portion of the integrated sensor system of FIG. 1.

In various implementations, the radar antenna housing 112 defines a second set of connecting portions 252 including, as shown in FIG. 3, a first connecting portion 252-1 defining a third aperture 244-1 and a second connecting portion 252-2 defining a fourth aperture 244-2. In various implementations, the third aperture 244-1 extends through the first surface 220 and the second surface 224. In various implementations, the third aperture 244-1 may receive at least a portion of the first fastening member 304. In various implementations, the third aperture 244-1 is aligned with the first aperture 148-1. In various implementations, the fourth aperture 244-2 extends through the first surface 220 and the second surface 224. In various implementations, the fourth aperture 244-2 may receive at least a portion of the second fastening member 308. In various implementations, the fourth aperture 244-2 is aligned with the second aperture 148-2.

The waveguide structure 236 may include a third portion 260 extending in a first direction and a fourth portion 264 extending from the third portion 260 in a second direction. The second direction may be transverse to the first direction. In various implementations, the second direction is perpendicular to the first direction. In various implementations, the waveguide structure 236 is disposed around the recess 240.

The third portion 260 may define a plurality of transmit waveguides 268. As explained further below, the plurality of transmit waveguides 268 may guide radio-frequency (RF) signals, such as RF signals generated by the radar circuit board 116, out of the integrated sensor system 100. In various implementations, the plurality of transmit waveguides 268 are equally spaced across the third portion 260. In various implementations, the plurality of transmit waveguides 268 are co-linear with one another. In various implementations, the plurality of transmit waveguides 268 includes eight waveguides. In various implementations, each of the plurality of transmit waveguides 268 extends through the second surface 224 of the radar antenna housing 112.

The fourth portion 264 may define a plurality of receive waveguides 272. As explained further below, the plurality of receive waveguides 272 may guide radio-frequency (RF) signals, such as external RF signals, into the integrated sensor system 100 (for example, the radar circuit board 116). In various implementations, the plurality of receive waveguides 272 includes four waveguides. In various implementations, at least one of the plurality of receive waveguides 272 is offset from a remainder of the plurality of receive waveguides 272. In various implementations, each of the plurality of receive waveguides 272 extends through the second surface 224 of the radar antenna housing 112.

In the assembled configuration, the fifth alignment member 222-1 may receive the first alignment member 206-1 and the sixth alignment member 222-2 may receive the second alignment member 206-2. In this regard, the first alignment member 206-1, the second alignment member 206-2, the fifth alignment member 222-1, and the sixth alignment member 222-2, collectively, are configured to align the camera assembly 108 within the recess 240 of the radar antenna housing 112.

In various implementations, the camera circuit board 172 includes a set of reliefs 174 that match the first set of alignment members 206. In various implementations, this matching is not one-to-one: for example, in FIG. 3, the set of reliefs 174 includes a first relief 174-1 that matches the first alignment member 206-1, a second relief 174-2 that matches the second alignment member 206-2, and a third relief 174-3 that matches third alignment member 206-3. In FIG. 3, fourth alignment member 206-4 does not match the set of reliefs 174.

In various implementations, one or more of the first set of alignment members 206 has protrusions that engage respective ones of the set of reliefs 174, and one or more of the first set of alignment members 206 engage the second set of alignment members 222. In the example of FIG. 3, the first alignment member 206-1 includes first and second surfaces that engages first and second sides, respectively, of the fifth alignment member 222-1; the fourth alignment member 206-4 includes a first surface that engages a first side of the sixth alignment member 222-2.

In various implementations, the radar antenna housing 112 includes a first groove 316 formed in the first surface 220, and a second rib 320 extending from the second surface 224. In the assembled configuration, the first groove 316 may receive the first rib 312. In various implementations, the integrated sensor system 100 includes a sealant material disposed in the first groove that create a watertight seal between the radome 104 and the radar antenna housing 112.

The radar circuit board 116 may communicate with the camera circuit board 172. In various implementations, the radar circuit board 116 may be connected to the camera circuit board 172 by a board-to-board connector. The radar circuit board 116 may transmit radio-frequency RF signals through the plurality of transmit waveguides 268. The radar circuit board 116 may receive RF signals through the first plurality of receive waveguides 272. In the assembled configuration, the radar circuit board 116 is coupled to the second surface 224 of the radar antenna housing 112.

The number, shapes, sizes (for example, width, height, and length), and location of the plurality of transmit waveguides 268 and of the plurality of receive waveguides 272 may be designed based on frequency bands of the RF signals, expected installation orientation and location of the integrated sensor system 100 within a vehicle, desired field of view, and desired depth of view.

Figure 5:
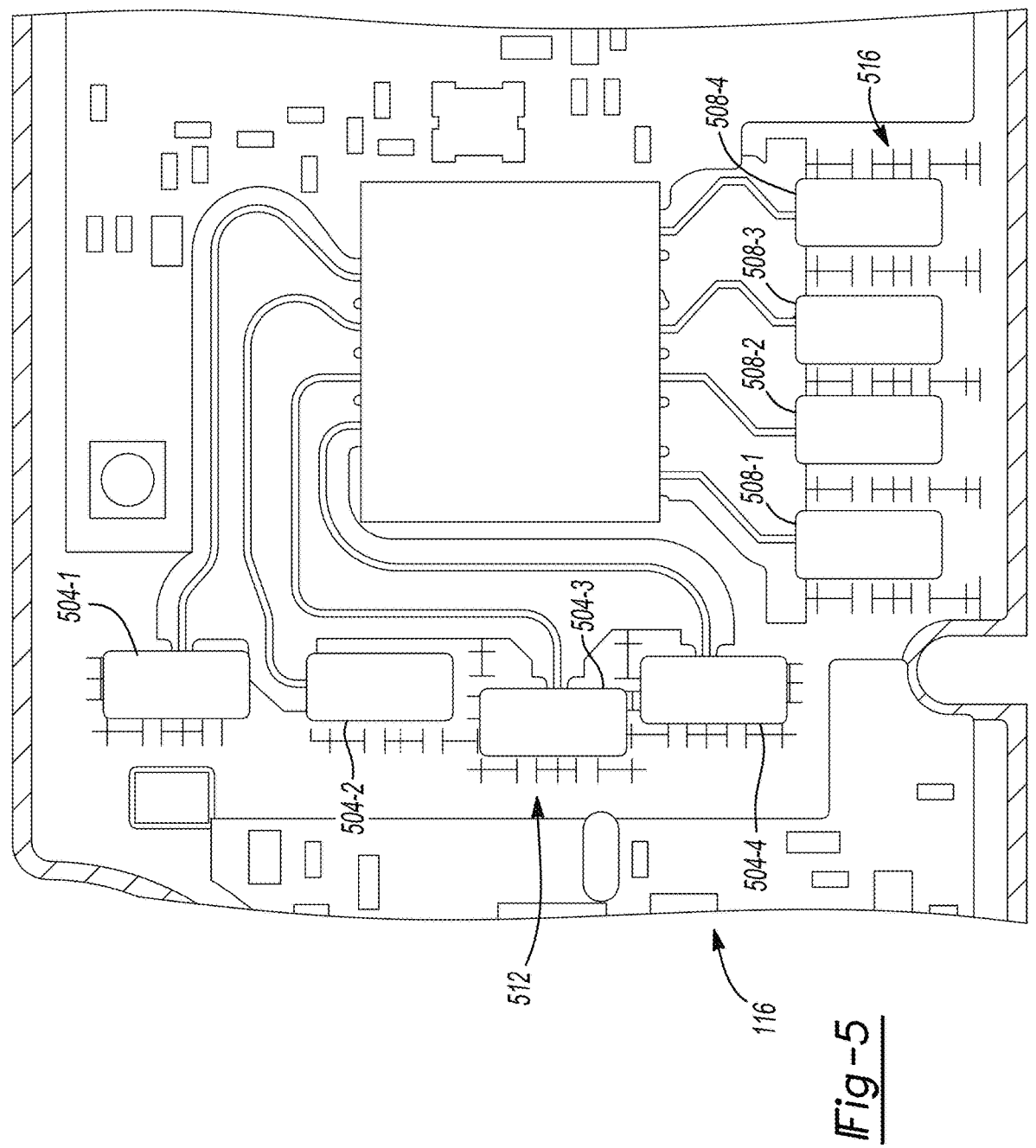
FIG. 5 is a schematic representation of an example radar circuit board.

FIG. 5 is a schematic view of an example implementation of the radar circuit board 116. In various implementations, the radar circuit board 116 includes a plurality of antenna transmitter elements 504 and a plurality of antenna receiver elements 508. In various implementations, the plurality of antenna transmitter elements 504 corresponds one-to-one with, and is aligned with, the plurality of transmit waveguides 268; further, in various implementations, the plurality of antenna receiver elements 508 corresponds one-to-one with, and is aligned with, the plurality of receive waveguides 272. As shown in FIG. 5, the plurality of antenna transmitter elements 504 may include antenna transmitter elements 504-1, 504-2, 504-3, and 504-4, while the plurality of antenna receiver elements 508 may include antenna receiver elements 508-1, 508-2, 508-3, and 508-4.

The design and spacing of the plurality of antenna transmitter elements 504 and the plurality of antenna receiver elements 508 may be determined based on a frequency band of interest around which the integrated sensor system 100 is designed. For example only, the frequency band of interest may encompass 76-81 GHz or an associated sub-band, such as 76-77 GHz.

In various implementations, the plurality of antenna receiver elements 508 are arranged in a line and spaced evenly, while the plurality of antenna transmitter elements 504 are not all arranged in a line or spaced evenly. For example, one of the plurality of antenna transmitter elements 504 may be offset from the line and spaced differently; in FIG. 5, the antenna transmitter element 504-3 is offset from the line and the spacing between the antenna transmitter element 504-3 and the antenna transmitter element 504-4 is closer than the spacing between the antenna transmitter element 504-3 and the antenna transmitter element 504-2, and both spacings may be greater than the spacing between the antenna transmitter element 504-1 and the antenna transmitter element 504-2.

In various implementations, separation elements, such as separation element 512, may be located between and/or adjacent to some or all of the plurality of antenna transmitter elements 504. In various implementations, separation elements, such as separation element 516, may be located between and/or adjacent to some or all of the plurality of antenna receiver elements 508. The separation elements, which may be connected to a ground plane, limit propagation of RF signals and therefore reduce crosstalk.

Rear Cover

The rear cover 120 may include a front surface 276, a rear surface 280 opposite the front surface 276, a connector 284 extending through the front surface 276 and the rear surface 280, and a set of vehicle mounting bosses 288 protruding from the rear surface 280. In various implementations, the set of vehicle mounting bosses 288 may be replaced with other vehicle mounting points that, for example, do not protrude from the rear surface 280.

Figure 4:
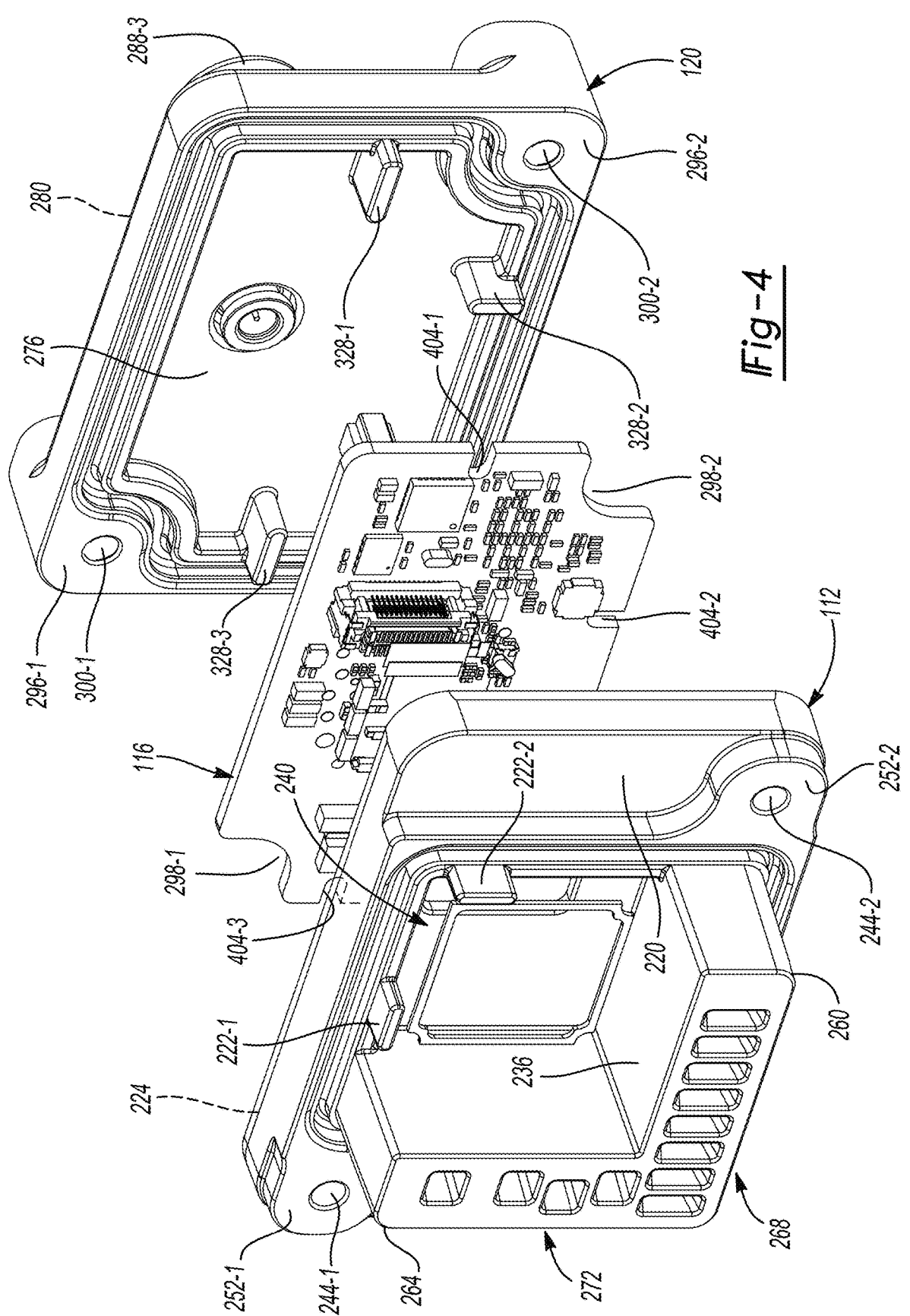
FIG. 4 is an exploded view of a second portion of the integrated sensor system of FIG. 1.

In various implementations, the rear cover 120 includes a third set of connecting portions 296. A shown in FIG. 4, the third set of connecting portions 296 may include a first connecting portion 296-1 that defines a fifth aperture 300-1 and a second connecting portion 296-2 that defines a sixth aperture 300-2. In various implementations, the radar circuit board 116 includes a set of reliefs 298 that allow the second set of connecting portions 252 to directly mate with the third set of connecting portions 296. As shown in FIG. 4, the set of reliefs 298 may include a first relief 298-1 and a second relief 298-2. In various implementations, the set of reliefs 298 allows front faces of the third set of connecting portions 296 to directly mate with rear faces of the second set of connecting portions 252. In this way, it may be unnecessary to use any sealing material between the radar circuit board 116 and the radar antenna housing 112 or between the radar circuit board 116 and the rear cover 120 to maintain the watertight nature of the integrated sensor system 100. Direct mating includes direct contact as well as contact via a sealing mechanism, such as a solid or viscous gasket or paste.

Figure 7:
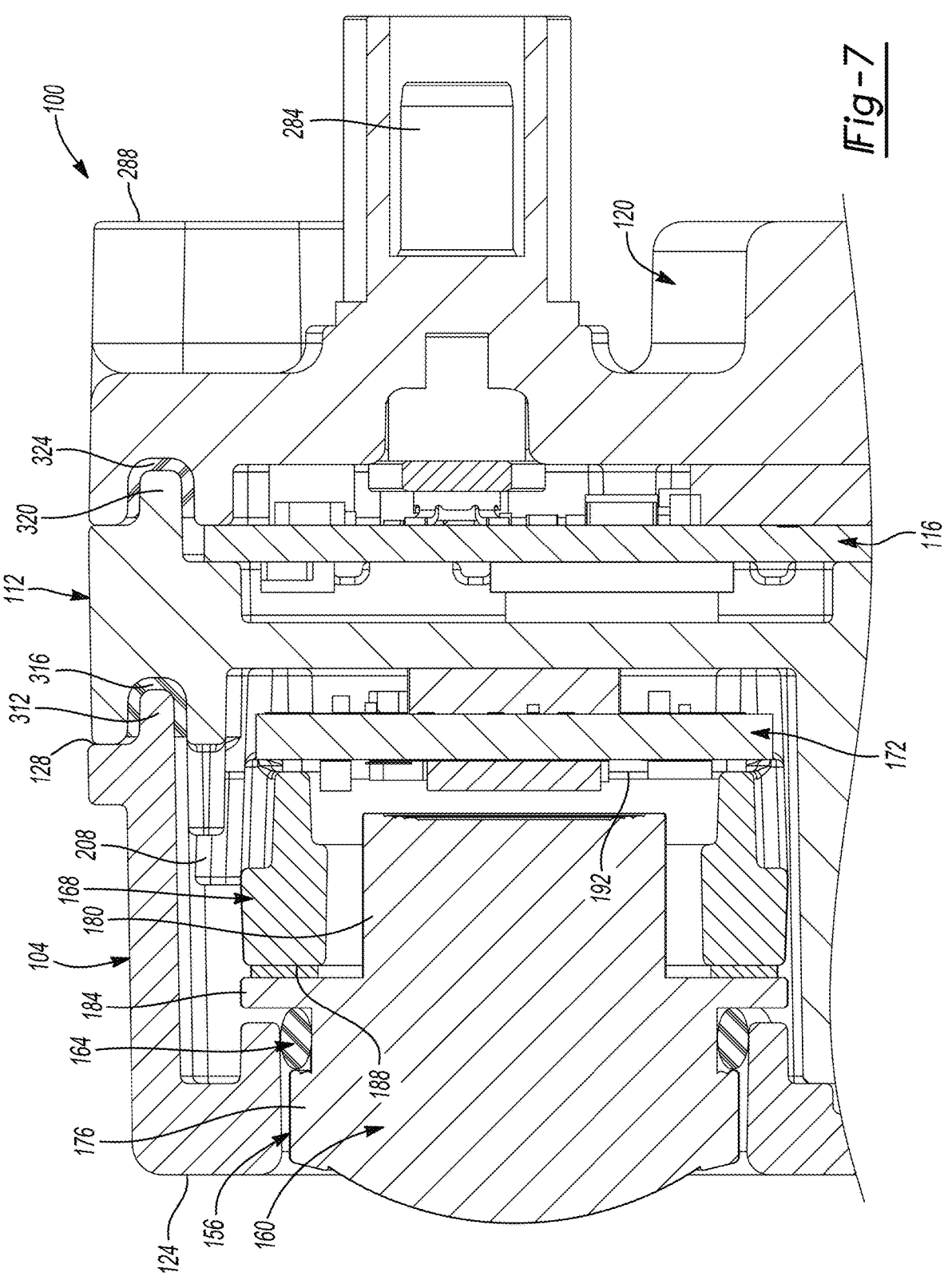
FIG. 7 is a cross-sectional view of the integrated sensor system of FIG. 1.

In various implementations, and as shown in cross-section in FIG. 7, the rear cover 120 includes a second groove 324 formed in the front surface 276. In the assembled configuration, the front surface 276 may engage the radar circuit board 116. The connector 284 may electrically connect the radar circuit board 116 to an external electrical system of the vehicle. In various implementations, the connector 284 is a Fokker connector.

In various implementations, the connector 284 may be the sole electrical connection between the integrated sensor system 100 and the vehicle. In various implementations, the connector 284 may carry both image data from the camera circuit board 172 and radar data from the radar circuit board 116. In various implementations, image data from the camera circuit board 172 is communicated to the radar circuit board 116, which combines the image data with the radar data for transmission via the connector 284. In various implementations, the connector 284 includes a single data channel, such as a single-ended or differential communication channel, over which both the radar data and the image data are communicated. In various implementations, the radar data and the image data are multiplexed onto a single data channel and then separated at a receiver for further processing.

Figure 6:
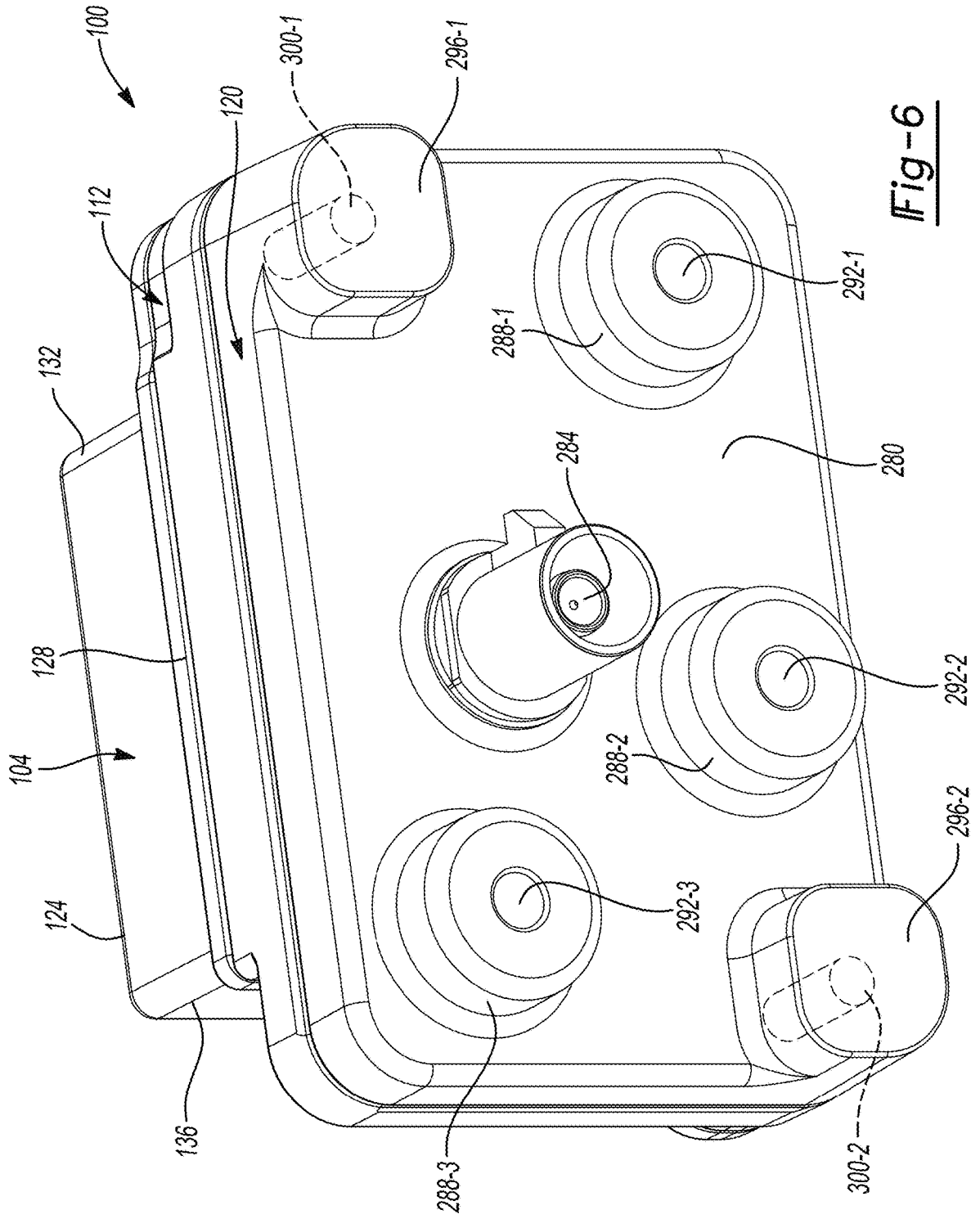
FIG. 6 is a rear perspective view of the integrated sensor system of FIG. 1.

In various implementations, each of the set of vehicle mounting bosses 288 defines a respective one of a set of recesses 292: for example, as shown in FIG. 6, a first recess 292-1, a second recess 292-2, and a third recess 292-3. Each of the set of recesses 292 may receive a corresponding vehicle fastener to mount the integrated sensor system 100 into or on the vehicle. 1

For example, as shown in FIG. 6, the set of vehicle mounting bosses 288 may include a first vehicle mounting boss 288-1, a second vehicle mounting boss 288-2, and a third vehicle mounting boss 288-3 that include, respectively, a first recess 292-1, a second recess 292-2, and a third recess 292-3 of the set of recesses 292.

In various implementations, the fifth aperture 300-1 receives at least a portion of the first fastening member 304. In various implementations, the fifth aperture 300-1 is aligned with the first aperture 148-1 and the third aperture 244-1. In the assembled configuration, the first fastening member 304 may extend through the first aperture 148-1, the third aperture 244-1, and the fifth aperture 300-1. In various implementations, the sixth aperture 300-2 receives at least a portion of the second fastening member 308. In various implementations, the sixth aperture 300-2 is aligned with the second aperture 148-2 and the fourth aperture 244-2. In the assembled configuration, the second fastening member 308 may extend through the second aperture 148-2, the fourth aperture 244-2, and the sixth aperture 300-2.

In the assembled configuration, the second groove 324 may receive the second rib 320. In various implementations, the integrated sensor system 100 includes a sealant material disposed in the second groove 324. In various implementations, the sealant material creates a watertight seal between the radar antenna housing 112 and the rear cover 120.

In various implementations, the rear cover 120 includes a set of alignment members 328—including, for example, a fifth alignment member 328-1, a sixth alignment member 328-2, and a seventh alignment member 328-3—each extending from the front surface 276. In various implementations, the set of alignment members 328 collectively assists in aligning the radar circuit board 116 to the rear cover 120. For example, the radar circuit board 116 includes reliefs 404-1, 404-2, and 404-3 (collectively, a set of reliefs 404) that match the set of alignment members 328.

In various implementations, a high-thermal-conductivity material is disposed between the front surface 276 and the radar circuit board 116 to transfer heat from the radar circuit board 116 to the rear cover 120. For example only, the high-thermal-conductivity material may be a thermal interface material such as a thermal paste.

Radome Variations

Figure 8:
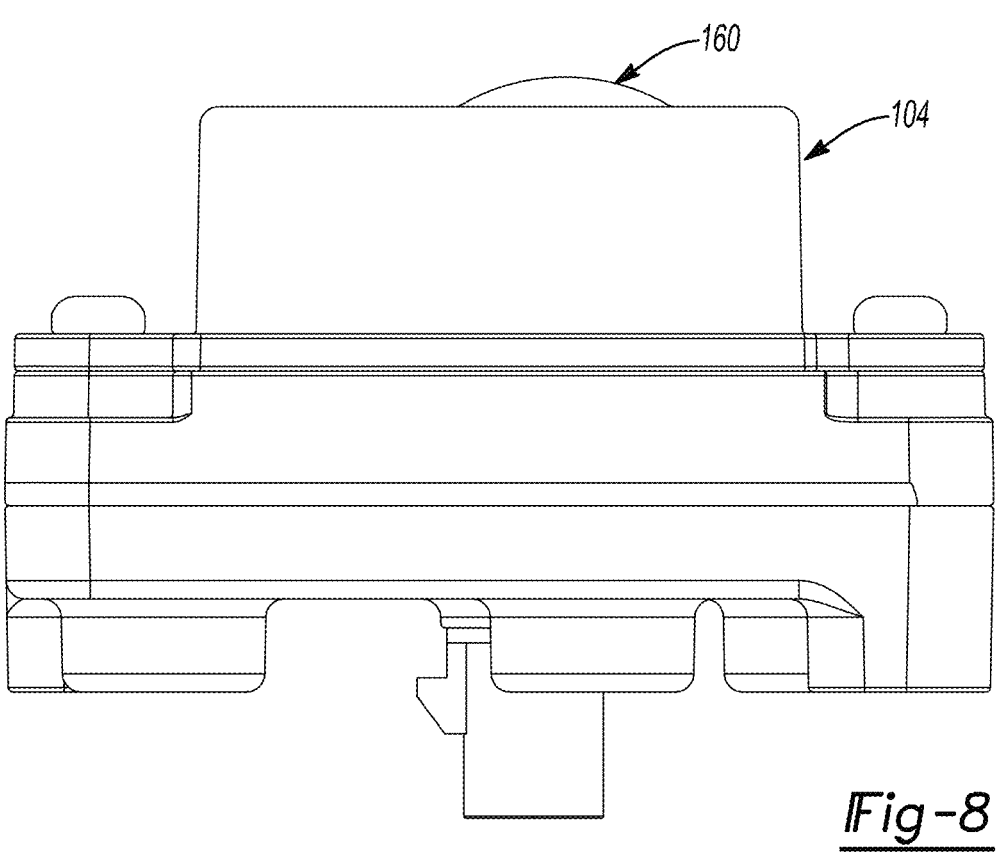
FIG. 8 is a side view of an example integrated sensor system according to the principles of the present disclosure.

In FIG. 8, a first portion 176 of the camera lens 160 barely protrudes from the radome 104—in some implementations, only a curved front lens of the first portion 176 protrudes from the radome 104.

Figure 9:
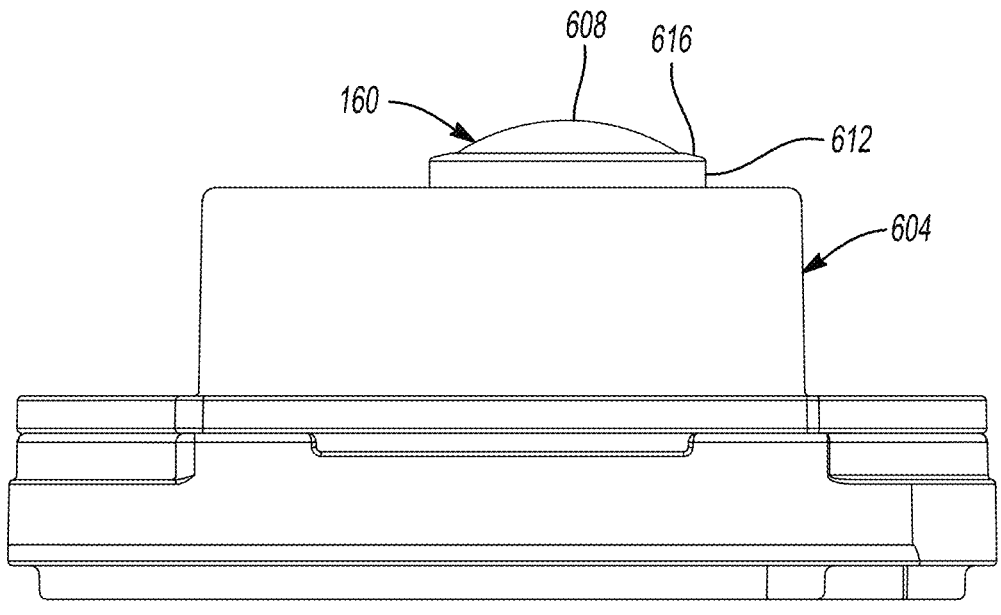
FIG. 9 is a partial side view of another example integrated sensor system according to the principles of the present disclosure.
Figure 10:
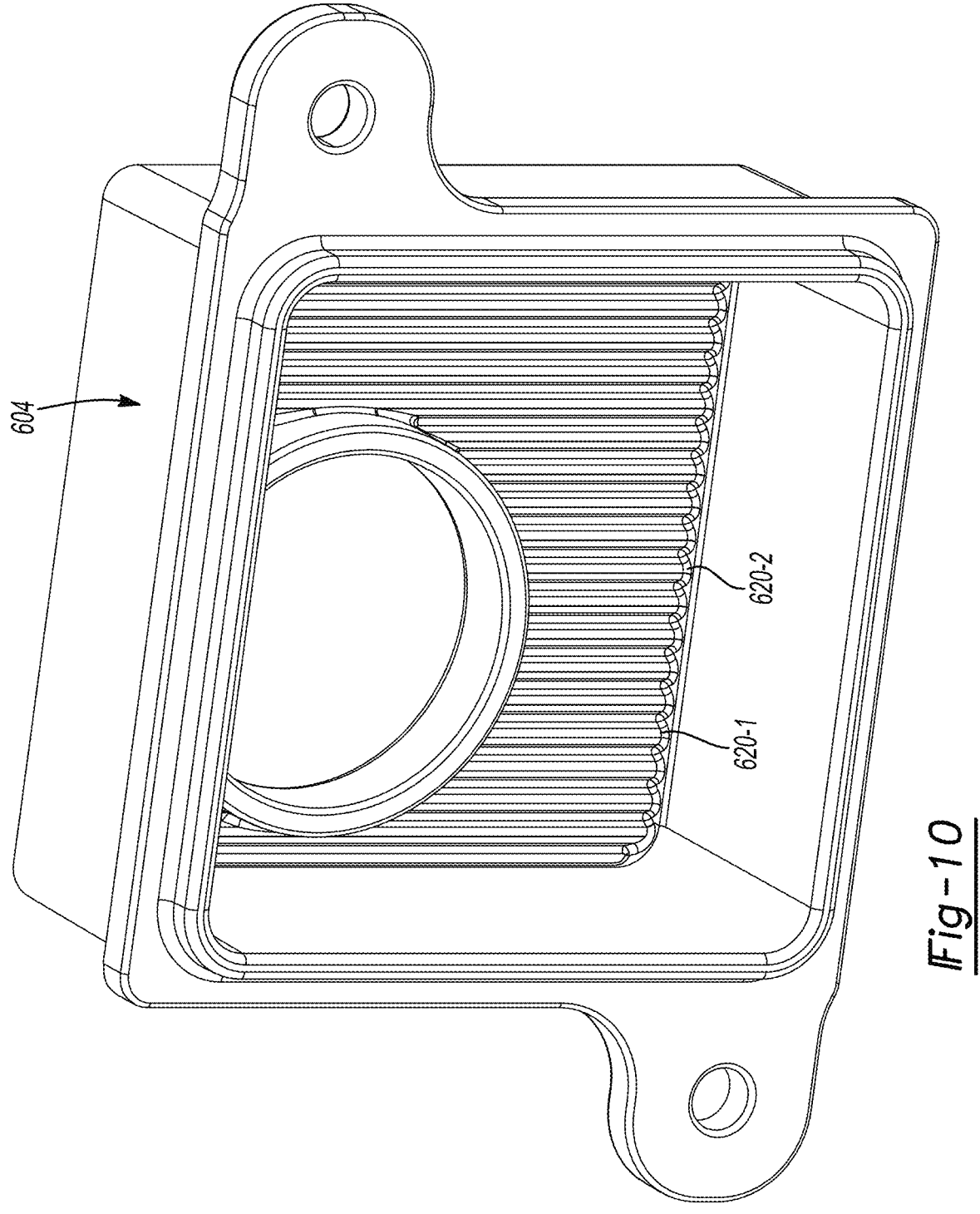
FIG. 10 is a perspective view of an example radome housing according to the principles of the present disclosure.

In contrast, in FIG. 9, more of the first portion 176 protrudes from a radome 604. The radome 604 may be the same as the radome 104. In other implementations, the radome 604 may protrude less—in the orientation shown in FIG. 9, that would mean that the radome 604 is shorter than the radome 104. The radome 604 may be made shorter by adjusting a front surface of the radome 604 so that the front surface can be placed closer to the waveguide structure 236 (not shown in FIG. 9). For example, the radome 604 may be implemented as shown in FIG. 10, with a structured front surface. A front of the radome 604 may extend 2 mm past a front of the waveguide structure 236, while the front of the radome 104 extends 3 mm past a front of the waveguide structure 236.

By the first portion 176 protruding from the radome 604, the camera lens 160 may obtain a greater field of view, such as 180 degrees or more. In particular, the camera lens 160 may include a dome portion 608 and a cylindrical portion 612 connected by a chamfer 616. In various implementations, all of the dome portion 608 protrudes from the radome 604, while at least some of the cylindrical portion 612 protrudes from the radome 604.

In FIG. 10, an example of the radome 604 is shown with a structured interior surface. The interior surface of the radome 604 may be located more closely (by, for example, approximately 1 mm) to the waveguide structure 236 because the structured surface prevents coupling of dielectric waveguide modes. For example, the structured interior surface may be made up of a plurality of ridges 620, including ridge 620-1 and ridge 620-2. In various implementations, the plurality of ridges 620 may all be parallel to each other and spaced equidistantly. Orienting the ridges to be orthogonal to the electromagnetic fields allows for a lower effective permittivity, since the flux is lower. Lower permittivity makes it less able to propagate dielectric waves, so the radome 604 can be closer to the waveguide structure 236.

In various implementations, the plurality of ridges 620 may be restricted to a limited area of the interior surface of the radome 604. For example, the limited area may correspond to portions of the radome 604 encountered by radio waves emitted by the plurality of transmit waveguides 268, radio waves received by the plurality of receive waveguides 272, or both. In various implementations, the limited area may match the size, shape, and location of the waveguide structure 236. Outside the limited area, the interior surface of the radome 604 may be smooth or have a surface treatment other than ridged. Constraining the plurality of ridges 620 to a limited area may have advantages such as reduced manufacturing time, lower weight, etc.

In various implementations, the radome 604 is made of plastic. The plastic has a higher index of refraction than air and slows down the wave. Along the boundary of two materials these different speeds must be balanced, so the wave will bend, which is called refraction. Snell's law of refraction shows that the higher index of refraction material (radome) has a smaller propagation angle than in free space, refracting the wave around the camera lens 160. This may allow the antenna radiation to wrap around the camera lens 160 without interference. Otherwise, to have a wide field of view for both the radar and camera, the camera would be in the field of view of the radar, thus occluding it.

The design of the radome 604 may allow the radar and camera subsystems to be placed close to each other, both with a wide and unobstructed field of view. Due to its design, the radome 604 can be located closer to the radiation surface (such as the waveguide structure 236), which allows the camera lens 160 to protrude from the radome 604. This protrusion may allow for a wide-angle view (sometimes referred to as a fish-eye view), such as approximately 200 degrees.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Unless indicated otherwise, numbering or other labeling of instructions or method steps is done for convenient reference, not to indicate a fixed order. Numerical terms, such as "first," "second," and "third," may be used in the disclosure and claims as unique labels: they are not used to imply a sequence or order unless the context clear indicates otherwise. In other words, a "second element" could be relabeled as a "first element" without departing from the principles of the present disclosure. Further, the presence of a "second element" does not imply or require the presence of a "first element."

Unless the context clearly indicates otherwise, the singular articles "a," "an," and "the" before a noun do not restrict the noun to a single instance. The verbs "comprise,"

"include," and "have" are inclusive and therefore specify the presence of elements without excluding the presence of one or more additional elements.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements are described using various terms, including "connected," "coupled," "engaged," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

The term "set" generally means a grouping of one or more elements. The elements of a set do not necessarily need to have any characteristics in common or otherwise belong together. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR. The phrase "A, B, and/or C" should be construed in the same way as the phrase "at least one of A, B, and C."

CLAUSES

Various example embodiments of the invention are described in the following clauses.

Clause 1: An integrated sensor system (100) for a vehicle, the integrated sensor system (100) comprising:
a radome (104) including a main body portion (118) and a set of connecting portions (122), wherein the radome (104) defines a first opening (156);
a camera assembly (108) including:
a camera lens (160), wherein at least a portion of the camera lens (160) is disposed in the first opening (156),
a sealing member (164) disposed between the camera lens (160) and the radome (104),
a camera housing (168) including a first set of alignment members (206), wherein:
the camera housing (168) defines a second opening (216), and
at least a portion of the camera lens (160) is disposed in the second opening (216), and
a camera circuit board (172) configured to engage the camera lens (160) and the first set of alignment members (206);
a radar antenna housing (112) including a second set of alignment members (222) and a waveguide structure (236), wherein:
the radar antenna housing (112) defines a recess (240), and
the second set of alignment members (222) is configured to align the camera assembly (108) with respect to the radar antenna housing (112) in the recess (240);
a radar circuit board (116) configured to (i) communicate with the camera circuit board (172) and (ii) transmit and receive radio-frequency (RF) signals through the waveguide structure (236); and
a rear cover (120) including:
a connector (284) configured to electrically connect the radar circuit board (116) to an external electrical system, and
a set of vehicle mounting points (288).
Clause 2: The integrated sensor system of clause 1 wherein a cross-section of the main body portion (118) is square.
Clause 3: The integrated sensor system of clause 2 wherein the cross-section is approximately thirty-five millimeters by approximately thirty-five millimeters.
Clause 4: The integrated sensor system of any of clauses 1-3 wherein a center of the first opening (156) is offset from a center of the main body portion (118).
Clause 5: The integrated sensor system of any of clauses 1-4 wherein the set of connecting portions (122) is set back from a front face (124) of the main body portion (118).
Clause 6: The integrated sensor system of any of clauses 1-5 wherein the set of connecting portions (122) extends from a rear face (128) of the main body portion (118).
Clause 7: The integrated sensor system of clause 6 wherein a cross-sectional area of the rear cover (120) is greater than a cross-sectional area of the main body portion (118) at all cross-sections forward of the rear face (128).
Clause 8: The integrated sensor system of any of clauses 6-7 wherein the set of connecting portions includes:
a first connecting portion (122-1), and
a second connecting portion (122-2) located at an opposite corner of the rear face (128) from the first connecting portion (122-1).

Clause 9: The integrated sensor system of any of clauses 1-7 wherein:

the main body portion (118) includes a front face (124) and a rear face (128) opposite the front face (124), and the first opening (156) extends from the front face (124) through the rear face (128).

Clause 10: The integrated sensor system of any of clauses 1-9 wherein:

the radar antenna housing (112) includes a second set of connecting portions (252) that match the set of connecting portions (122); and the rear cover (120) includes a third set of connecting portions (296) that match the second set of connecting portions (252).

Clause 11: The integrated sensor system of clause 10 wherein each of the set of connecting portions (122) includes an aperture that aligns with an aperture of a respective one of the second set of connecting portions (252) and an aperture of a respective one of the third set of connecting portions (296).

Clause 12: The integrated sensor system of clauses 10-11 wherein each of the set of connecting portions (122) includes a through-hole aperture that aligns with a through-hole aperture of a respective one of the second set of connecting portions (252) and a tapped, blind aperture of a respective one of the third set of connecting portions (296).

Clause 13: The integrated sensor system of clause 12 further comprising a set of threaded fasteners (304) corresponding one-to-one with the set of connecting portions (122).

Clause 14: The integrated sensor system of clauses 10-13 wherein each of the set of connecting portions (122) directly mates with a respective one of the second set of connecting portions (252) without interference by the camera circuit board (172).

Clause 15: The integrated sensor system of clauses 10-14 wherein each of the second set of connecting portions (252) directly mates with a respective one of the third set of connecting portions (296) without interference by the radar circuit board (116).

Clause 16: The integrated sensor system of clauses 10-15 wherein:

the set of connecting portions (122) includes a first connecting portion (122-1) and a second connecting portion (122-2);

the second set of connecting portions (252) includes a first connecting portion (252-1) and a second connecting portion (252-2); and the third set of connecting portions (296) includes a first connecting portion (296-1) and a second connecting portion (296-2).

Clause 17: The integrated sensor system of any of clauses 1-16 wherein:

the camera lens (160) includes a first portion (176), a second portion (180), and a rim portion (184) disposed between the first portion (176) and the second portion (180);

a cross-sectional area of the rim portion (184) is larger than a cross-sectional area of the first portion (176) and larger than a cross-sectional area of the second portion (180);

the first portion (176) is disposed in the first opening (156); and the second portion (180) is optically coupled to the camera circuit board (172).

Clause 18: The integrated sensor system of clause 17 wherein:

the sealing member (164) surrounds the first portion (176); and the sealing member (164) is sandwiched between the rim portion (184) and a rear face of the first opening (156).

Clause 19: The integrated sensor system of any of clauses 17-18 wherein the rim portion (184) is secured to a front side (188) of the camera housing (168) with an adhesive.

Clause 20: The integrated sensor system of any of clauses 17-19 wherein the second portion (180) extends through the second opening (216).

Clause 21: The integrated sensor system of any of clauses 1-20 wherein the first set of alignment members (206) locate the camera circuit board (172) with respect to the camera housing (168).

Clause 22: The integrated sensor system of any of clauses 1-21 wherein the camera circuit board (172) includes a set of reliefs (174) that correspond to the first set of alignment members (206) to locate the camera circuit board (172) with respect to the camera housing (168).

Clause 23: The integrated sensor system of clause 22 wherein the set of reliefs (174) corresponds one-to-one with all but one of the first set of alignment members (206).

Clause 24: The integrated sensor system of clauses 1-23 wherein the second set of alignment members (222) contacts the first set of alignment members (206) to locate the camera housing (168) with respect to the radar antenna housing (112).

Clause 25: The integrated sensor system of clauses 1-24 wherein the second set of alignment members (222) includes:

a first alignment member (222-1) with first and second sides that respectively engage a first alignment member (206-1) of the first set of alignment members (206); and a second alignment member (222-2) with a first side that engages a fourth alignment member (206-4) of the first set of alignment members (206).

Clause 26: The integrated sensor system of any of clauses 1-25 wherein the camera circuit board (172) and the camera housing (168) are fully contained within the recess (240).

Clause 27: The integrated sensor system of any of clauses 1-26 wherein the waveguide structure (236) defines first and second sides of the recess (240).

Clause 28: The integrated sensor system of clause 27 wherein:

a first portion of the waveguide structure (236) defines the first side of the recess (240); and a second portion of the waveguide structure (236) defines the second side of the recess (240).

Clause 29: The integrated sensor system of clause 28 wherein the first portion of the waveguide structure (236) and the second portion of the waveguide structure (236) are orthogonal to each other.

Clause 30: The integrated sensor system of clauses 28-29 wherein:

the first portion of the waveguide structure (236) includes a plurality of receive waveguides (272); and the second portion of the waveguide structure (236) includes a plurality of transmit waveguides (268).

Clause 31: The integrated sensor system of any of clauses 1-30 wherein the radar antenna housing (112) is formed from at least one of: zinc, aluminum, or magnesium.

Clause 32: The integrated sensor system of any of clauses 1-31 wherein the waveguide structure (236) is a single piece including at least one of: zinc, aluminum, or magnesium.

Clause 33: The integrated sensor system of any of clauses 1-32 wherein the waveguide structure (236) includes:

a plurality of receive waveguides (272) corresponding to a plurality of receive elements (508) of the radar circuit board (116); and a plurality of transmit waveguides (268) corresponding to a plurality of transmit elements (504) of the radar circuit board (116).

Clause 34: The integrated sensor system of clause 33 wherein:

the plurality of transmit waveguides (268) are aligned and equally spaced;

the plurality of receive waveguides (272) are unequally spaced along a first direction; and one receive waveguide (504-3) of the plurality of receive waveguides (272) is offset, in a second direction transverse to the first direction, from a remainder of the plurality of receive waveguides (272).

Clause 35: The integrated sensor system of any of clauses 1-34 wherein the rear cover (120) includes a third set of alignment members (328) configured to locate the radar circuit board (116) with respect to the rear cover (120).

Clause 36: The integrated sensor system of clause 35 wherein the radar circuit board (116) includes a set of reliefs (404) that receives the third set of alignment members (328).

Clause 37: The integrated sensor system of any of clauses 1-36 wherein the rear cover (120) includes:

a front surface (276) configured to engage the radar circuit board (116);

a rear surface (280) opposite the front surface (276); and a third set of connecting portions (296) that corresponds to the set of connecting portions (122) and protrudes from the rear surface (280).

Clause 38: The integrated sensor system of clause 37 wherein the set of vehicle mounting points (288) protrudes from the rear surface (280).

Clause 39: The integrated sensor system of clause 38 wherein each of the set of vehicle mounting points (288) defines a respective one of a set of recesses (292) that is configured to receive a respective one of a set of vehicle fasteners.

Clause 40: The integrated sensor system of clause 39 wherein each of the set of vehicle fasteners is a threaded fastener.

Clause 41: The integrated sensor system of any of clauses 1-40 wherein:

the radome (104) includes a first rib (312), and the radar antenna housing (112) includes a first groove (316) configured to receive the first rib (312).

Clause 42: The integrated sensor system of any of clauses 1-40 wherein:

the radar antenna housing (112) includes a second rib (320), and the rear cover (120) includes a second groove (324) configured to receive the second rib (320).

Clause 43: The integrated sensor system of any of clauses 1-42 further comprising a thermal interface material configured to conduct heat from the radar circuit board (116) to the rear cover (120).

Clause 44: The integrated sensor system of any of clauses 1-43 wherein:

the integrated sensor system is configured to be mounted at a mounting surface of an exterior of the vehicle, and the radome (104) is configured to be disposed within an opening in the mounting surface.

Clause 45: The integrated sensor system of clause 44 wherein, when the integrated sensor system is mounted in the vehicle:

the radome (104) is configured to extend past the mounting surface, and the set of connecting portions (122) and the rear cover (120) are configured to remain at an interior of the mounting surface.

Clause 46: The integrated sensor system of any of clauses 1-45 wherein a front surface of the radome (104) includes a plurality of parallel raised ribs.

Clause 47: The integrated sensor system of clause 46 wherein:

an exterior of the front surface is flat; and an interior of the front surface includes the plurality of parallel raised ribs.

Clause 48: The integrated sensor system of any of clauses 1-47 wherein the camera lens (160) protrudes from the radome (104).

Clause 49: The integrated sensor system of clause 48 wherein:

the camera lens (160) includes a dome portion connected to a cylindrical portion;

all of the dome portion and at least some of the cylindrical portion protrudes from a front surface of the radome (104); and the camera lens (160) has a field of view of at least 180 degrees.

REFERENCE NUMBER LIST

100 integrated sensor system
104 radome
108 camera assembly
112 radar antenna housing
116 radar circuit board
118 main body portion
120 rear cover
122 set of connecting portions
122-1 first connecting portion
122-2 second connecting portion
124 front face
128 rear face
132 first edge
136 second edge
148-1 first aperture
148-2 second aperture
156 first opening
160 camera lens
164 sealing member
168 camera housing
172 camera circuit board
174 set of reliefs
174-1 first relief
174-2 second relief
174-3 third relief
176 first portion
180 second portion
184 rim portion
188 front side
192 rear side
196 first edge
200 second edge 204 upper edge
206 first set of alignment members
206-1 first alignment member
206-2 second alignment member
206-3 third alignment member
206-4 fourth alignment member
216 opening
220 first surface
222 second set of alignment members
222-1 fifth alignment member
222-2 sixth alignment member
224 second surface
236 waveguide structure
240 recess
244-1 third aperture
244-2 fourth aperture
252 second set of connecting portions
252-1 first connecting portion
252-2 second connecting portion
260 third portion
264 fourth portion
268 plurality of transmit waveguides
272 plurality of receive waveguides
276 front surface
280 rear surface
284 connector
288 set of vehicle mounting bosses
288-1 first vehicle mounting boss
288-2 second vehicle mounting boss
288-3 third vehicle mounting boss
292 set of recesses
292-1 first recess
292-2 second recess
292-3 third recess
296 third set of connecting portions
296-1 first connecting portion
296-2 second connecting portion
298 set of reliefs
298-1 first relief
298-2 second relief
300-1 fifth aperture
300-2 sixth aperture
304-1 first fastening member
304-2 second fastening member
312 first rib
316 first groove
320 second rib
324 second groove
328 third set of alignment members
328-1 fifth alignment member
328-2 sixth alignment member
328-3 seventh alignment member
328 fourth set of alignment members
404 set of reliefs
404-1 first relief
404-2 second relief
504 plurality of antenna transmitter elements
504-1 antenna transmitter element
504-2 antenna transmitter element
504-3 antenna transmitter element
504-4 antenna transmitter element
508 plurality of antenna receiver elements
508-1 antenna receiver element
508-2 antenna receiver element
508-3 antenna receiver element
508-4 antenna receiver element
512 separation element 516 separation element
604 radome
608 dome portion
612 cylindrical portion
616 chamfer
620 plurality of ridges
620-1 ridge
620-2 ridge

The invention claimed is:

1. An integrated sensor system for a vehicle, the integrated sensor system comprising:
  a radome including a main body portion and a set of connecting portions, wherein the radome defines a first opening;
  a camera assembly including:
    a camera lens, wherein at least a portion of the camera lens is disposed in the first opening,
    a sealing member disposed between the camera lens and the radome,
    a camera housing including a first set of alignment members, wherein:
      the camera housing defines a second opening, and
      at least a portion of the camera lens is disposed in the second opening, and
    a camera circuit board configured to engage the camera lens and the first set of alignment members;
  a radar antenna housing including a second set of alignment members and a waveguide structure, wherein:
    the radar antenna housing defines a recess, and
    the second set of alignment members is configured to align the camera assembly with respect to the radar antenna housing in the recess;
  a radar circuit board configured to (i) communicate with the camera circuit board and (ii) transmit and receive radio-frequency (RF) signals through the waveguide structure; and
  a rear cover including:
    a connector configured to electrically connect the radar circuit board to an external electrical system, and
    a set of vehicle mounting points.

2. The integrated sensor system of claim 1 wherein:
  a cross-section of the main body portion is square; and
  the cross-section is approximately thirty-five millimeters by approximately thirty-five millimeters.

3. The integrated sensor system of claim 2 wherein a cross-sectional area of the rear cover is greater than a cross-sectional area of the main body portion at all cross-sections forward of a rear face of the main body portion.

4. The integrated sensor system of claim 1 wherein a center of the first opening is offset from a center of the main body portion.

5. The integrated sensor system of claim 1 wherein:
  the set of connecting portions is set back from a front face of the main body portion; and
  the set of connecting portions extends from a rear face of the main body portion.

6. The integrated sensor system of claim 1 wherein:
  the radar antenna housing includes a second set of connecting portions that match the set of connecting portions; and
  the rear cover includes a third set of connecting portions that match the second set of connecting portions.

7. The integrated sensor system of claim 6 wherein each of the set of connecting portions includes an aperture that aligns with an aperture of a respective one of the second set of connecting portions and an aperture of a respective one of the third set of connecting portions.

8. The integrated sensor system of claim 7 wherein:

each of the set of connecting portions directly mates with a respective one of the second set of connecting portions without interference by the camera circuit board; and each of the second set of connecting portions directly mates with a respective one of the third set of connecting portions without interference by the radar circuit board.

9. The integrated sensor system of claim 1 wherein:

the camera lens includes a first portion, a second portion, and a rim portion disposed between the first portion and the second portion;

a cross-sectional area of the rim portion is larger than a cross-sectional area of the first portion and larger than a cross-sectional area of the second portion;

the first portion is disposed in the first opening;

the second portion is optically coupled to the camera circuit board;

the sealing member surrounds the first portion;

the sealing member is sandwiched between the rim portion and a rear face of the first opening; and the second portion extends through the second opening.

10. The integrated sensor system of claim 1 wherein:

the first set of alignment members locate the camera circuit board with respect to the camera housing;

the camera circuit board includes a set of reliefs that correspond to the first set of alignment members to locate the camera circuit board with respect to the camera housing; and the set of reliefs corresponds one-to-one with all but one of the first set of alignment members.

11. The integrated sensor system of claim 1 wherein the second set of alignment members contacts the first set of alignment members to locate the camera housing with respect to the radar antenna housing.

12. The integrated sensor system of claim 1 wherein the camera circuit board and the camera housing are fully contained within the recess.

13. The integrated sensor system of claim 1 wherein:

a first portion of the waveguide structure defines a first side of the recess;

a second portion of the waveguide structure defines a second side of the recess; and the first portion of the waveguide structure and the second portion of the waveguide structure are orthogonal to each other.

14. The integrated sensor system of claim 13 wherein:

the first portion of the waveguide structure includes a plurality of receive waveguides; and the second portion of the waveguide structure includes a plurality of transmit waveguides.

15. The integrated sensor system of claim 1 wherein the waveguide structure includes:

a plurality of receive waveguides corresponding to a plurality of receive elements of the radar circuit board; and a plurality of transmit waveguides corresponding to a plurality of transmit elements of the radar circuit board.

16. The integrated sensor system of claim 15 wherein:

the plurality of transmit waveguides are aligned and equally spaced;

the plurality of receive waveguides are unequally spaced along a first direction; and one receive waveguide of the plurality of receive waveguides is offset, in a second direction transverse to the first direction, from a remainder of the plurality of receive waveguides.

17. The integrated sensor system of claim 1 wherein:

the rear cover includes a third set of alignment members configured to locate the radar circuit board with respect to the rear cover; and the radar circuit board includes a set of reliefs that receives the third set of alignment members.

18. The integrated sensor system of claim 1 further comprising a thermal interface material configured to conduct heat from the radar circuit board to the rear cover, wherein:

the radome includes a first rib;

the radar antenna housing includes a first groove configured to receive the first rib;

the radar antenna housing includes a second rib, and the rear cover includes a second groove configured to receive the second rib.

19. The integrated sensor system of claim 1 wherein:

the integrated sensor system is configured to be mounted at a mounting surface of an exterior of the vehicle;

the radome is configured to be disposed within an opening in the mounting surface; and when the integrated sensor system is mounted in the vehicle:

the radome is configured to extend past the mounting surface, and the set of connecting portions and the rear cover are configured to remain at an interior of the mounting surface.

20. The integrated sensor system of claim 1 wherein:

an exterior of a front surface of the radome is flat;

an interior of the front surface includes a plurality of parallel raised ribs;

the camera lens includes a dome portion connected to a cylindrical portion;

all of the dome portion and at least some of the cylindrical portion protrudes from a front surface of the radome; and the camera lens has a field of view of at least 180 degrees.

\* \* \* \* \*